(12) United States Patent
Gokmen

(10) Patent No.: US 11,562,249 B2
(45) Date of Patent: Jan. 24, 2023

(54) DNN TRAINING WITH ASYMMETRIC RPU DEVICES

(71) Applicant: International Business Machines Corporation, Armonk, NY (US)

(72) Inventor: Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 16/400,674

(22) Filed: May 1, 2019

(65) Prior Publication Data

US 2020/0349440 A1 Nov. 5, 2020

(51) Int. Cl.
*G06N 3/08* (2006.01)
*G06N 20/10* (2019.01)
*G06N 3/063* (2006.01)
*G06N 3/04* (2006.01)

(52) U.S. Cl.
CPC .............. *G06N 3/084* (2013.01); *G06N 3/049* (2013.01); *G06N 3/063* (2013.01); *G06N 20/10* (2019.01)

(58) Field of Classification Search
CPC ........ G06N 3/084; G06N 20/10; G06N 3/049; G06N 3/063
See application file for complete search history.

(56) References Cited

U.S. PATENT DOCUMENTS

| | | | |
|---|---|---|---|
| 6,594,382 B1 | 7/2003 | Woodall | |
| 9,646,243 B1 | 5/2017 | Gokmen | |
| 10,134,472 B1 | 11/2018 | Leobandung et al. | |
| 10,185,803 B2 | 1/2019 | Frey et al. | |
| 10,248,907 B2 | 4/2019 | Gokmen et al. | |
| 10,387,778 B2 * | 8/2019 | Gokmen | G06N 3/0635 |
| 10,608,017 B2 | 3/2020 | Takahashi et al. | |
| 10,831,860 B2 * | 11/2020 | Kim | G06F 17/16 |

(Continued)

FOREIGN PATENT DOCUMENTS

| | | |
|---|---|---|
| CN | 103150596 A | 6/2013 |
| CN | 108375856 A | 8/2018 |
| CN | 108596780 A | 9/2018 |

OTHER PUBLICATIONS

Babu et al., "Stochastic learning in deep neural networks based on nanoscale PCMO device characteristics," Neurocomputing 321, pp. 227-236 (Sep. 2018).

(Continued)

*Primary Examiner* — Paulinho E Smith
(74) *Attorney, Agent, or Firm* — James Olsen; Michael J. Chang, LLC

(57) ABSTRACT

In a method of training a DNN, a weight matrix (W) is provided as a linear combination of matrices/arrays A and C. In a forward cycle, an input vector x is transmitted through arrays A and C and output vector y is read. In a backward cycle, an error signal δ is transmitted through arrays A and C and output vector z is read. Array A is updated by transmitting input vector x and error signal δ through array A. In a forward cycle, an input vector $e_i$ is transmitted through array A and output vector y' is read. ƒ(y') is calculated using y'. Array C is updated by transmitting input vector $e_i$ and ƒ(y') through array C. A DNN is also provided.

24 Claims, 10 Drawing Sheets

(56) References Cited

U.S. PATENT DOCUMENTS

| | | | | |
|---|---|---|---|---|
| 11,188,826 | B2* | 11/2021 | Gokmen | G06N 3/084 |
| 2015/0170025 | A1* | 6/2015 | Wu | G06N 3/0635 |
| | | | | 706/25 |
| 2017/0091621 | A1* | 3/2017 | Gokmen | G06N 3/049 |
| 2017/0109628 | A1 | 4/2017 | Gokmen et al. | |
| 2018/0060726 | A1 | 3/2018 | Gokmen et al. | |
| 2018/0075350 | A1 | 3/2018 | Gokmen | |
| 2018/0253642 | A1 | 9/2018 | Gokmen et al. | |
| 2019/0080233 | A1 | 3/2019 | Procter et al. | |
| 2020/0117699 | A1* | 4/2020 | Kim | G06N 3/084 |
| 2020/0349440 | A1* | 11/2020 | Gokmen | G06N 3/049 |

OTHER PUBLICATIONS

English Translation of CN103150596A by Ouyang Jian, Jun. 12, 2013 (8 pages).

Gokmen et al., "Training Deep Convolutional Neural Networks with Resistive Cross-point Devices," Frontiers in Neuroscience, vol. 11, article 538 (Oct. 2017) (13 pages).

Kim et al., "Analog CMOS-based Resistive Processing Unit for Deep Neural Network Training," 2017 IEEE 60th International Midwest Symposium on Circuits and Systems (MWACAS), (Aug. 2017) (4 pages).

Rumelhart et al., "Learning representations by back-propagating errors," Nature 323, pp. 533-536 (Oct. 1986).

Lecun et al., Deep Learning, Nature 521, pp. 436-444 (May 2015).

Gokmen et al., "Acceleration of Deep Neural Network Training with Resistive Cross-Point Devices: Design Considerations," Frontiers in Neuroscience, vol. 10, article 333 (Jul. 2016) (13 pages).

Gokmen et al., "Training LSTM Networks with Resistive Cross-Point Devices," arXiv: 1806.00166 (Jun. 2018) (17 pages).

* cited by examiner

One hot encoding

| 1 | 0 | 0 | 0 |
| 0 | 1 | 0 | 0 |
| 0 | 0 | 1 | 0 |
| 0 | 0 | 0 | 1 |

Hadamard-2

| 1 | 1 | 0 | 0 |
| 1 | -1 | 0 | 0 |
| 0 | 0 | 1 | 1 |
| 0 | 0 | 1 | -1 |

Hadamard-4

$$\begin{matrix} 1 & 1 & 1 & 1 \\ 1 & -1 & 1 & -1 \\ 1 & 1 & -1 & -1 \\ 1 & -1 & -1 & 1 \end{matrix}$$

↑ ↑ ↑ ↑
$1^{st}$ $2^{nd}$ $3^{rd}$ $4^{th}$
$5^{th}$ $6^{th}$ $7^{th}$ $8^{th}$

DNN TRAINING WITH ASYMMETRIC RPU DEVICES

FIELD OF THE INVENTION

The present invention relates to deep neural network (DNN) training, and more particularly, to techniques for training a DNN having asymmetric resistive processing unit (RPU) devices.

BACKGROUND OF THE INVENTION

A deep neural network (DNN) can be embodied in an analog cross-point array of resistive devices such as the resistive processing units (RPUs) described in U.S. Patent Application Publication Number 2017/0109628 by Gokmen et al., entitled "Resistive Processing Unit" (hereinafter "U.S. Patent Application Publication Number 2017/0109628"), the contents of which are incorporated by reference as if fully set forth herein. As described in U.S. Patent Application Publication Number 2017/0109628, each RPU includes a first terminal, a second terminal and an active region. A conductance state of the active region identifies a weight value of the RPU, which can be updated/adjusted by application of a signal to the first/second terminals.

DNN based models have been used for a variety of different cognitive based tasks such as object and speech recognition and natural language processing. See, for example, Gokmen et al., "Training Deep Convolutional Neural Networks with Resistive Cross-point Devices," Frontiers in Neuroscience, vol. 11, article 538 (October 2017) (13 pages), the contents of which are incorporated by reference as if fully set forth herein. DNN training is needed to provide a high level of accuracy when performing such tasks. Training large DNNs is an extremely computationally intensive task.

Symmetry is an important factor to achieve accuracy for DNN training. To be symmetric, the analog resistive devices have to change conductance symmetrically when subjected to positive and negative voltage pulses. This symmetry enables backpropagation and stochastic gradient decent (SGD) to be implemented perfectly during DNN training. In practice, however, RPU devices can exhibit non-linear and non-symmetric switching characteristics, which is not ideal. For instance, when voltage pulses are applied stepwise to adjust the weight up or down, there is often an imbalance between up and down adjustments.

Accordingly, new DNN training techniques are needed to tolerate this non-linear/non-symmetric hardware bias.

SUMMARY OF THE INVENTION

The present invention provides techniques for training a deep neural network (DNN) having asymmetric resistive processing unit (RPU) devices. In one aspect of the invention, a method of training a DNN is provided. The method includes: providing a weight matrix (W) as a linear combination of a matrix A and a matrix C, wherein the matrix A and the matrix C are formed by stored conductance values in separate cross-point arrays A and C of RPU devices, each having conductive row wires orthogonal to conductive column wires, and the RPU devices separating intersections between the conductive row wires and the conductive column wires, whereby the RPU devices function as weighted connections between neurons in the DNN; transmitting, in a forward cycle, an input vector x as voltage pulses through the conductive column wires of the cross-point array A and the cross-point array C and reading a resulting output vector y as current output from the conductive row wires of the cross-point array A and the cross-point array C; transmitting, in a backward cycle, an error signal δ calculated from the output vector y as voltage pulses through the conductive row wires of the cross-point array A and the cross-point array C and reading a resulting output vector z as current output from the conductive column wires of the cross-point array A and the cross-point array C; transmitting, in an update of the cross-point array A, the input vector x as voltage pulses through the conductive column wires of the cross-point array A simultaneously with the error signal δ as voltage pulses through the conductive row wires of the cross-point array A; transmitting, in a forward cycle, an input vector $e_i$ as voltage pulses through the conductive column wires of the cross-point array A and reading a resulting output vector y' as current output from the conductive row wires of the cross-point array A; calculating $f(y')$ using y'; and transmitting, in an update of the cross-point array C, the input vector $e_i$ as voltage pulses through the conductive column wires of the cross-point array C simultaneously with $f(y')$ as voltage pulses through the conductive row wires of the cross-point array C.

In another aspect of the invention, a DNN is provided. The DNN includes: a weight matrix (W) as a linear combination of a matrix A and a matrix C, wherein the matrix A and the matrix C store conductance values in separate cross-point arrays A and C of RPU devices, each having conductive row wires orthogonal to conductive column wires, and the RPU devices separating intersections between the conductive row wires and the conductive column wires, whereby the RPU devices include weighted connections between neurons in the DNN; and a reference array, interconnected with the cross-point array A, that stores zero-weight conductance values for the RPU devices in the cross-point array A.

A more complete understanding of the present invention, as well as further features and advantages of the present invention, will be obtained by reference to the following detailed description and drawings.

BRIEF DESCRIPTION OF THE DRAWINGS

FIG. 10 is a diagram illustrating an exemplary one hot encoded vector according to an embodiment of the present invention;

FIG. 11 is a diagram illustrating an exemplary Hadamard matrix of order 2 according to an embodiment of the present invention;

DETAILED DESCRIPTION OF PREFERRED EMBODIMENTS

Provided herein are deep neural network (DNN) training techniques with asymmetric resistive processing unit (RPU) devices. As highlighted above, a DNN can be embodied in an analog cross-point array of RPUs. See, for example, the schematic diagram shown in FIG. 1.

Figure 1:
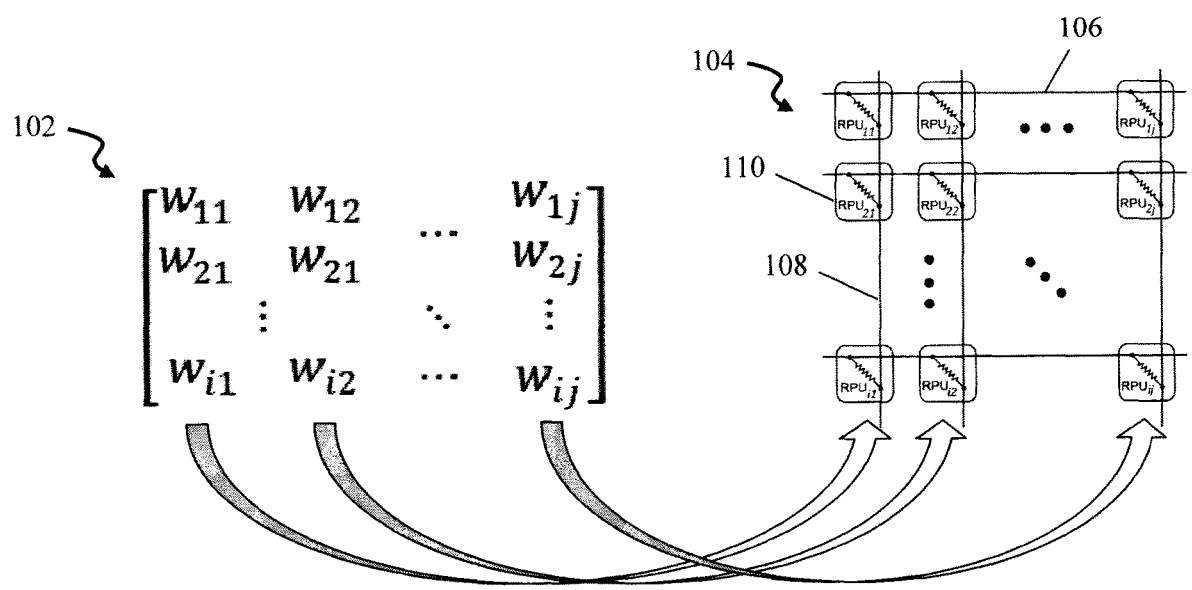
FIG. 1 is a diagram illustrating a deep neural network (DNN) embodied in an analog cross-point array of resistive processing unit (RPU) devices according to an embodiment of the present invention.

As shown in FIG. 1, each parameter (weight $w_{ij}$) of algorithmic (abstract) weight matrix 102 is mapped to a single RPU device ($RPU_{ij}$) on hardware, namely a physical cross-point array 104 of RPU devices. Cross-point array 104 includes a series of conductive row wires 106 and a series of conductive column wires 108 oriented orthogonal to, and intersecting, the conductive row wires 106. The intersections between the row and column wires 106 and 108 are separated by RPUs 110 forming cross-point array 104 of RPU devices. As described in U.S. Patent Application Publication Number 2017/0109628, each RPU can include a first terminal, a second terminal and an active region. A conduction state of the active region identifies a weight value of the RPU, which can be updated/adjusted by application of a signal to the first/second terminals. Further, three-terminal (or even more terminal) devices can serve effectively as two-terminal resistive memory devices by controlling the extra terminals. For a description of three-terminal RPU devices see, for example, Kim et al., "Analog CMOS-based Resistive Processing Unit for Deep Neural Network Training," 2017 IEEE 60$^{th}$ International Midwest Symposium on Circuits and Systems (MWACAS), (August 2017) (4 pages), the contents of which are incorporated by reference as if fully set forth herein.

Each RPU ($RPU_{ij}$) is uniquely identified based on its location in (i.e., the i$^{th}$ row and j$^{th}$ column) of the cross-point array 104. For instance, working from the top to bottom, and from the left to right of the cross-point array 104, the RPU at the intersection of the first row wire 106 and the first column wire 108 is designated as $RPU_{11}$, the RPU at the intersection of the first row wire 106 and the second column wire 108 is designated as $RPU_{12}$, and so on. Further, the mapping of the parameters of weight matrix 102 to the RPUs of the cross-point array 104 follows the same convention. For instance, weight $w_{i1}$ of weight matrix 102 is mapped to $RPU_{ij}$ of the cross-point array 104, weight $w_{i2}$ of weight matrix 102 is mapped to $RPU_{i2}$ of the cross-point array 104, and so on.

The RPUs 110 of the cross-point array 104, in effect, function as the weighted connections between neurons in the DNN. The conduction state (e.g., resistance) of the RPUs 110 can be altered by controlling the voltages applied between the individual wires of the row and column wires 106 and 108, respectively. Data is stored by alteration of the RPU's conduction state to achieve a high conduction state or a low conduction state. The conduction state of the RPUs 110 is read by applying a voltage and measuring the current that passes through the target RPU 110. All of the operations involving weights are performed fully in parallel by the RPUs 110.

In machine learning and cognitive science, DNN based models are a family of statistical learning models inspired by the biological neural networks of animals, and in particular the brain. These models may be used to estimate or approximate systems and cognitive functions that depend on a large number of inputs and weights of the connections which are generally unknown. DNNs are often embodied as so-called "neuromorphic" systems of interconnected processor elements that act as simulated "neurons" that exchange "messages" between each other in the form of electronic signals. The connections in DNNs that carry electronic messages between simulated neurons are provided with numeric weights that correspond to the strength or weakness of a given connection. These numeric weights can be adjusted and tuned based on experience, making DNNs adaptive to inputs and capable of learning. For example, a DNN for handwriting recognition is defined by a set of input neurons which may be activated by the pixels of an input image. After being weighted and transformed by a function determined by the network's designer, the activations of these input neurons are then passed to other downstream neurons. This process is repeated until an output neuron is activated. The activated output neuron determines which character was read.

Figure 2A:
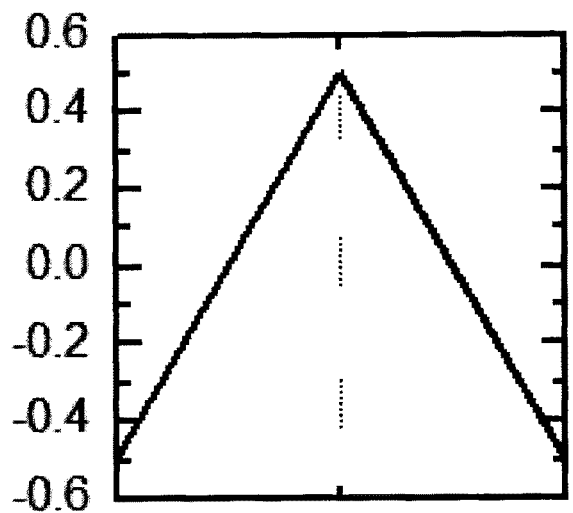
FIG. 2A is a diagram illustrating ideal switching characteristics of an RPU device that are linear and symmetric according to an embodiment of the present invention.

RPUs 110 can exhibit non-linear and non-symmetric switching characteristics, which is not ideal especially for training purposes. See, e.g., FIG. 2A and FIG. 2B. Referring first to FIG. 2A, the switching characteristics of an ideal RPU device are illustrated. As shown in FIG. 2A, in this ideal case, when an external voltage stimuli is applied to adjust the weight up or down the response is linear and symmetric. For training purposes, such an ideal device implements backpropagation and stochastic gradient decent (SGD) perfectly.

Namely, as will be described in further detail below, a DNN can be trained with an incremental or stochastic gradient decent (SGD) process, in which the error gradient of each parameter (weight $w_{ij}$) is calculated using backpropagation. See, for example, Rumelhart et al., "Learning representations by back-propagating errors," Nature 323, pp. 533-536 (October 1986), the contents of which are incorporated by reference as if fully set forth herein. Backpropagation is performed in three cycles, a forward cycle, a backward cycle, and a weight update cycle which are repeated multiple times until a convergence criterion is met.

DNN based models are composed of multiple processing layers that learn representations of data with multiple levels of abstraction. See, for example, LeCun et al., "Deep Learning, Nature 521, pp. 436-444 (May 2015), the contents of which are incorporated by reference as if fully set forth herein. For a single processing layer where N input neurons are connected to M output neurons, the forward cycle involves computing a vector-matrix multiplication (y=Wx) where the vector x of length N represents the activities of the input neurons, and the matrix W of size M×N stores the weight values between each pair of the input and output neurons. The resulting vector y of length M is further processed by performing a non-linear activation on each of the resistive memory elements and then passed to the next layer.

Once the information reaches to the final output layer, the backward cycle involves calculating the error signal and backpropagating the error signal through the DNN. The backward cycle on a single layer also involves a vector-matrix multiplication on the transpose (interchanging each row and corresponding column) of the weight matrix ($z=W^T\delta$), where the vector $\delta$ of length M represents the error calculated by the output neurons and the vector z of length N is further processed using the derivative of neuron non-linearity and then passed down to the previous layers.

Lastly, in the weight update cycle, the weight matrix W is updated by performing an outer product of the two vectors that are used in the forward and the backward cycles. This outer product of the two vectors is often expressed as $W \leftarrow W+\eta(\delta x^T)$, where i is a global learning rate.

All of the operations performed on the weight matrix W during this backpropagation process can be implemented with the cross-point array 104 of RPUs 110 having a corresponding number of M rows and N columns, where the stored conductance values in the cross-point array 104 form the matrix W. In the forward cycle, input vector x is transmitted as voltage pulses through each of the column wires 108, and the resulting vector y is read as the current output from the row wires 106. Similarly, when voltage pulses are supplied from the row wires 106 as input to the backward cycle, then a vector-matrix product is computed on the transpose of the weight matrix $W^T$. Finally, in the update cycle voltage pulses representing vectors x and $\delta$ are simultaneously supplied from the column wires 108 and the row wires 106. In this configuration, each RPU 110 performs a local multiplication and summation operation by processing the voltage pulses coming from the corresponding column wire 108 and row wire 106, thus achieving an incremental weight update.

As highlighted above, a symmetric RPU (see FIG. 2A) implements backpropagation and SGD perfectly. Namely, with such ideal RPUs $w_{ij} \leftarrow w_{ij}+\eta\Delta w_{ij}$, where $w_{ij}$ is the weight value for the $i^{th}$ row and $j^{th}$ column of the cross-point array 104.

Figure 2B:
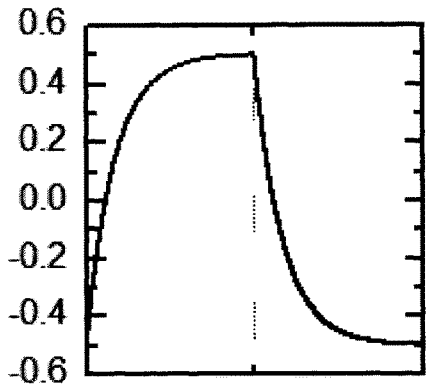
FIG. 2B is a diagram illustrating non-ideal switching characteristics of an RPU device that are non-linear and non-symmetric according to an embodiment of the present invention.

By contrast, the switching characteristics of a non-ideal RPU device are shown in FIG. 2B. As shown in FIG. 2B, in this non-ideal case, when an external voltage stimuli is applied the response is non-linear and non-symmetric. Namely, when voltage pulses are applied stepwise to adjust the weight up or down (referred to herein as "up" and "down" pulses, respectively), the amount of weight update (i.e., the size of the steps) is linearly dependent on the current weight value. Thus, there is only a single weight value (corresponding to the zero weight value from the zero shifting technique described in detail below) where the up and down adjustments are equal in strength but otherwise imbalanced for the rest of the weight range. Assuming a set of up and down pulse sequence are given to the RPU device, this imbalance means that the device has a tendency to go up or down towards the symmetry point where the strengths of the up and down pulses are equal. This device behavior can be translated into an additional energy term (internal energy) that is originating from the RPU device's physics governing the conductance change in the RPU device. Thus, when used for backpropagation, these RPUs with non-deal switching characteristics implement something very different from the ideal case, i.e., $w_{ij} \leftarrow w_{ij}+\eta\Delta w_{ij}+G(w_{ij})|\Delta w_{ij}|$, where $G(w_{ij})$ $|\Delta w_{ij}|$ represents the additional energy term (internal energy) that shows up due to asymmetric switching characteristics of the RPU devices.

It has been found that with resistive memory devices, such as RPUs 110, that there is always one single symmetry point where the slopes of the up and down pulses for each device are exactly the same. See, for example, U.S. patent application Ser. No. 16/158,056 by Kim et al., entitled "Alignment Techniques to Match Symmetry Point as Zero-Weight Point in Analog Crosspoint Arrays" (hereinafter "U.S. patent application Ser. No. 16/158,056"), the contents of which are incorporated by reference as if fully set forth herein. This symmetry point (which can be different) can be assigned a weight value of zero.

The symmetry point for each RPU 110 in the cross-point array 104 (which can vary from one device to another) is determined by applying repeated (first, second, third, etc.) up and down voltage pulses to the RPUs 110 in the weight array (e.g., matrix A—see below) until all of the RPUs 110 in the weight array converge to their own symmetry point. For instance, if the conductance range is from Gmin to Gmax, and average delta G at one update incident is dGavg, then the effective number of states in the conductance range is (Gmax−Gmin)/dGavg. When a device is at the extreme points and alternating up/dn pulses are given, then it will take # of updates to reach the center point=(Gmax−Gmin)/dGavg. To ensure the convergence, one can give extra cycles of alternating up/dn pulses, e.g., n×(Gmax−Gmin)/dGavg, where n=1 or larger. The up and down voltage pulses can be applied to the RPUs 110 randomly (i.e., each pulse is randomly either an up or a down pulse), in an alternating manner (i.e., if the preceding pulse is an up pulse, then the next pulse is a down pulse, and vice versa), etc. See U.S. patent application Ser. No. 16/158,056.

Once all of the RPUs 110 in the weight array have all converged to their own symmetry point, the conductance values for each RPU 110 from the weight array (at the symmetry point) are copied to a separate, reference array that is interconnected with the weight array. There is a one-to-one correlation between the devices in the weight array and reference array such that a unique zero-weight value can be established in each device in the reference array for one corresponding device in the weight array. Thus, during operation, the outputs of the RPUs 110 in the weight array are shifted by the zero-weight value from the corresponding devices stored in the reference array. For instance, the same signal can be provided to both the weight array and the reference array. The output from the RPUs 110 in the weight array (e.g., $I_1$, $I_2$, $I_3$, etc.) can then be zero-shifted by subtracting those values from the output of the corresponding devices in the reference array (set to a zero-weight value) to achieve zero-shifted results. See U.S. patent application Ser. No. 16/158,056.

After this initial setting to achieve zero-shifted results, the present techniques are used to train the DNNs. See, for example, methodology 300 of FIG. 3. In its most general form, the weight matrix (W) used in accordance with the present techniques is a linear combination of two matrices A and C, i.e., $W=\gamma A+C$, where $\gamma$ is a scalar factor. During initialization, the reference array with the zero-weight values (see above) is used to ensure that each RPU in matrix A is at its equilibrium point for a weight value corresponding to zero. During training, the weight updates are accumulated on matrix A that has symmetric behavior around the zero point, and then moved to matrix C. Advantageously, this coupled system (embodied in matrix A and matrix C) minimizes the objective function of the neural network and the internal energy of the RPUs in a self-consistent manner to tolerate the hardware bias associated with non-ideal RPUs, and hence gives superior results as compared to the standard SGD technique simply being performed using asymmetric devices.

Figure 3:
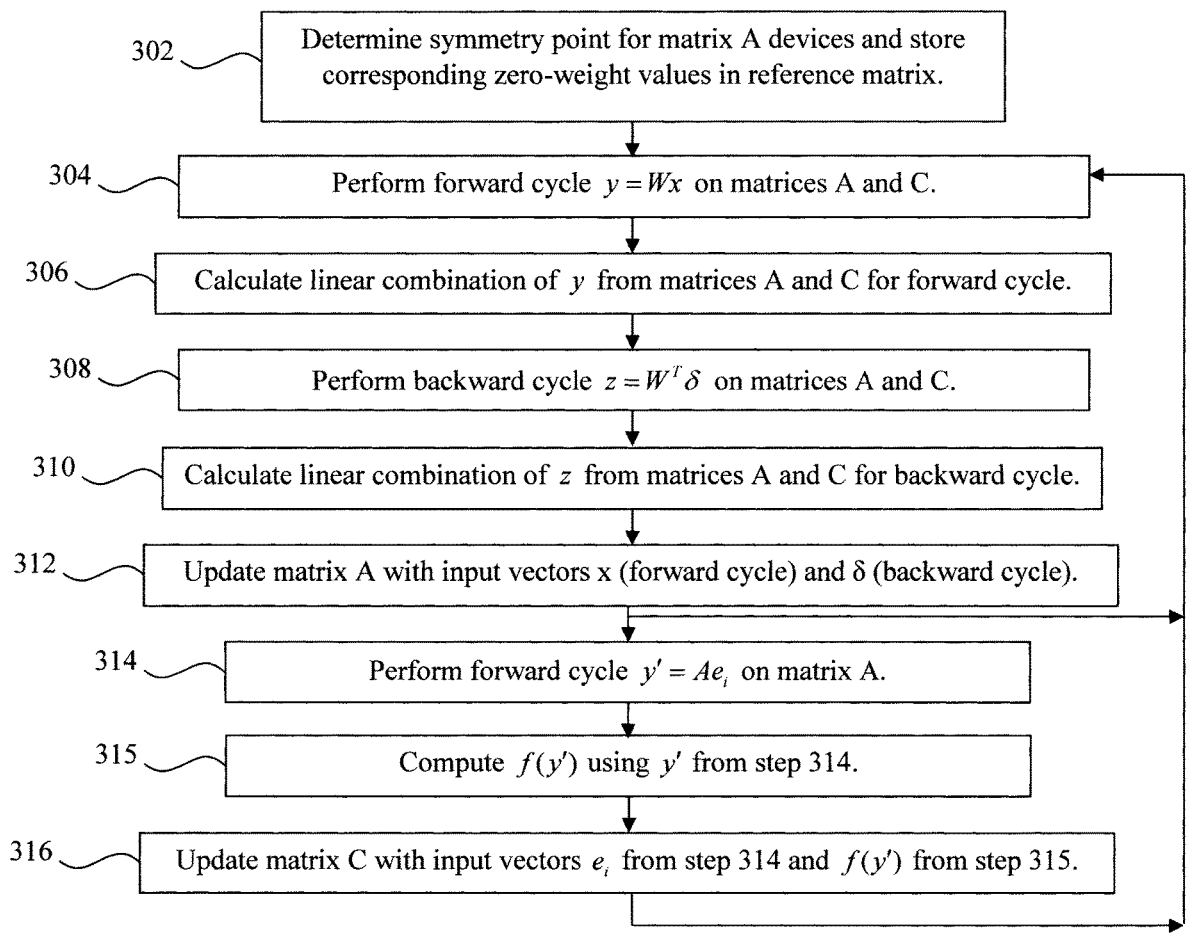
FIG. 3 is a diagram illustrating an exemplary methodology for training a DNN according to an embodiment of the present invention.

Specifically, referring to FIG. 3, in step 302 the symmetry point for each RPU in the matrix A is determined and the corresponding zero-weight conductance values are copied to a reference array. As provided above, the symmetry point for each RPU device can be determined by applying repeated up and down voltage pulses (e.g., randomly, alternating, etc.) to the RPUs in matrix A until all of the RPUs in the matrix A converge to their own symmetry point. Matrix A and the reference matrix can be embodied in two interconnected arrays. See, for example, FIG. 4.

Figure 4:
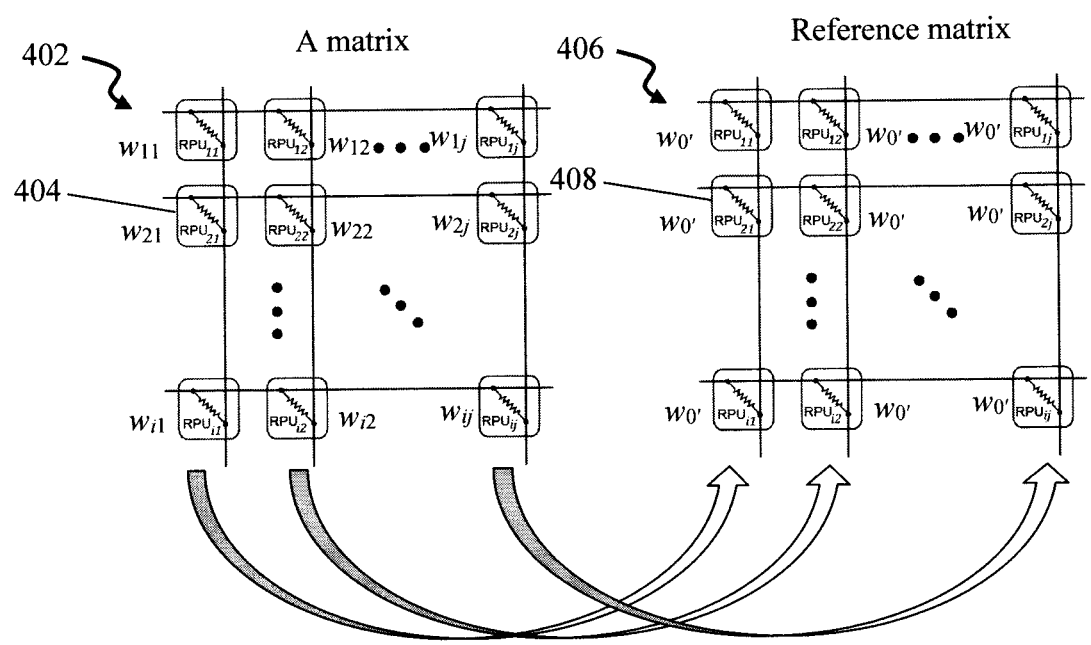
FIG. 4 is a diagram illustrating two interconnected arrays (i.e., an array A and a reference array) corresponding to a matrix A and a reference matrix populated with the zero-weight conductance values of the matrix A according to an embodiment of the present invention.

Namely, referring briefly to FIG. 4, a cross-point array 402 of RPUs 404 (populated with the weight values ($w_{ij}$) of weight matrix A) and a cross-point array 406 of RPUs 408 (populated with the corresponding zero-weight conductance values ($w_{ij}'$) of the reference matrix) are shown. As shown in FIG. 4, there is a one-to-one correlation between the RPUs 404 in the cross-point array 402 (matrix A) and the RPUs 408 in the cross-point array 406 (reference matrix) such that a unique zero-weight value ($w_{ij}'$) can be established in each RPU in the reference matrix for one corresponding RPU in the weight matrix A. As will be described in detail below, when matrix A is read (e.g., in the forward and backward operations) array 402 (i.e., array A) and array 406 (i.e., reference array) in a differential mode. By contrast, when updating matrix A operations are performed only to update array 402 (i.e., array A).

Referring back to methodology 300 of FIG. 3, once the zero-weight conductance values have been stored in the reference array, training of the DNN is performed using a modified SGD process. Overall, the goal of the training process is to determine the best set of parameters (weights $w_{ij}$) for maximizing the accuracy of the DNN. By 'modified' it is meant that while the present SGD training process calculates the error gradient using backpropagation performed, as described above, in three cycles: a forward cycle, a backward cycle, and a weight update cycle, here operations are performed on a coupled system of matrices A and C instead of a single weight matrix. Weight updates are accumulated on the matrix A (that has symmetric behavior around the zero point—see step 302, above). This accumulated information is then moved to the matrix C.

As shown in FIG. 3, the process begins with a forward cycle being performed using the weight matrix (W), i.e., W=γA+C, where γ is a scalar factor. Thus, as highlighted above, weight matrix (W) is a linear combination of two separate matrices A and C. The parameters of matrix A and matrix C are mapped to the RPU devices in separate cross-point arrays (e.g., also referred to herein as array A and array C, respectively). Generally, the forward cycle involves computing a vector-matrix multiplication (y=Wx) where the input vector x represents the activities of the input neurons, and the matrix W (where W=γA+C) stores the weight values between each pair of the input and output neurons. It is notable that since the weight value W is set as the linear combinations of A and C such that W=γA+C, one can get to these extreme cases simply by setting γ=0 or γ=1. When γ=1 this gives W=A+C, and when γ=0 this gives W=C, the latter representing a case where matrix A is 'hidden.'

According to an exemplary embodiment, this forward cycle is performed on the matrices A and C separately in step 304, and then the linear combination is calculated in step 306, e.g., using digital circuits (following analog-to-digital conversion). For instance, referring briefly to FIG. 5, it is shown that the vector-matrix multiplication operations of the forward cycle are implemented (as per step 304) in the cross-point arrays 402 and 508 of RPU devices, where the stored conductance values in the cross-point arrays 402 and 508 form the matrices A and C, respectively.

Figure 5:
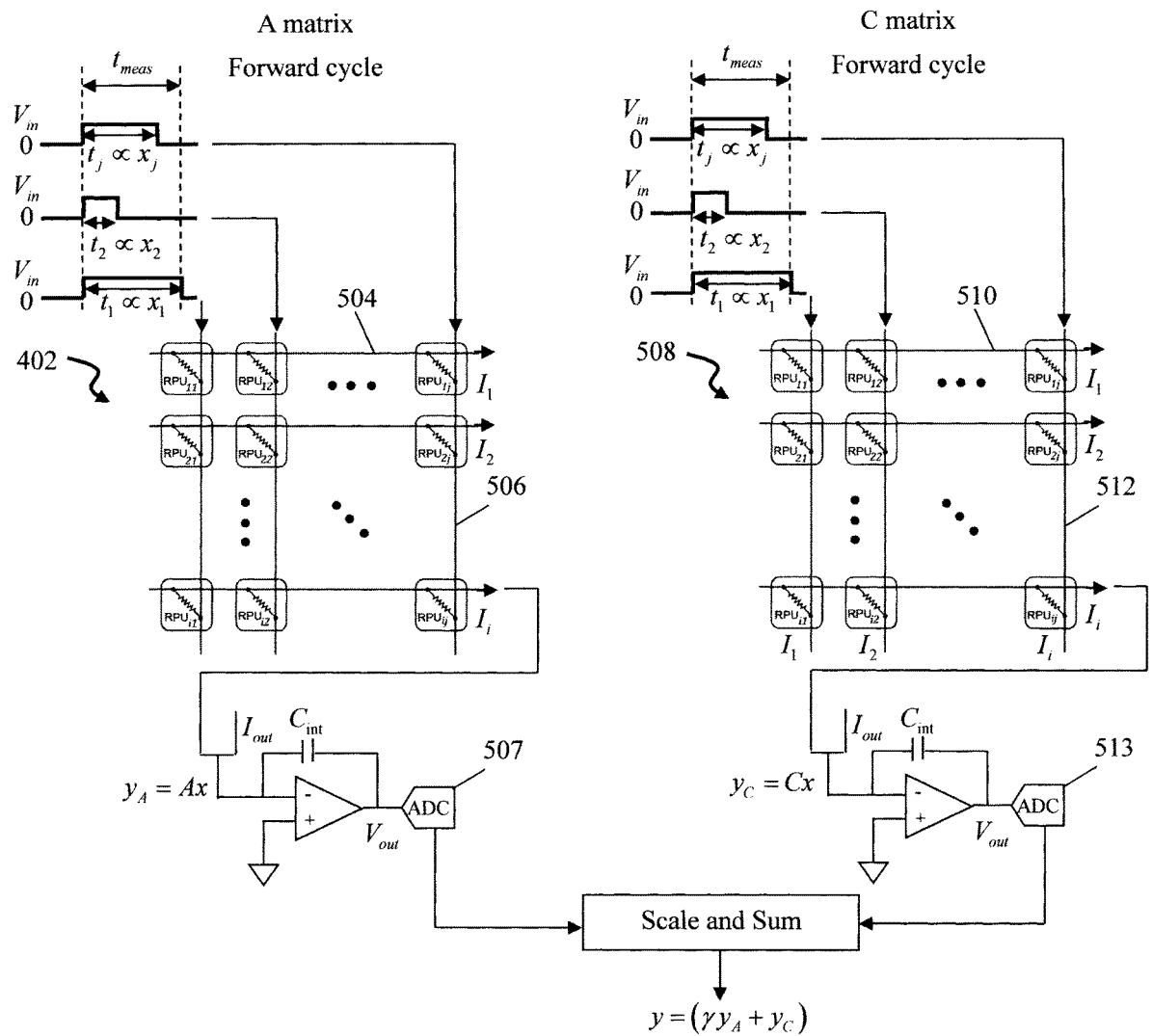
FIG. 5 is a diagram illustrating a forward cycle y=Wx being performed separately on the array A and an array C, with y as a linear combination of output from the array A and the array C according to an embodiment of the present invention.

As shown in FIG. 5, in the forward cycle, the input vector x is transmitted as voltage pulses through each of the conductive column wires 506 and 512, and the resulting output vector y is read as the current output from the conductive row wires 504 and 510 of cross-point arrays 402 (matrix A) and 508 (matrix C), respectively, as per step 304 of methodology 300. As also shown in FIG. 5, an analog-to-digital converter (ADC) 507 and an ADC 513 are employed to convert the (analog) output vectors $y_A$=Ax and $y_C$=Cx, from cross-point arrays 402 (matrix A) and 508 (matrix C), respectively, to digital signals. Thus, as per step 306 of methodology 300, the linear combination of these digitized signals, y=γ$y_A$+$y_C$, can be easily determined, i.e., $$y_A = Ax$$

$$y_C = Cx$$

$$y = \gamma y_A + y_C.$$

As shown in FIG. 5, the signals generated by the different arrays but corresponding to the same columns for the forward cycle are scaled and summed in the digital domain implementing standard multiplication and summation operations.

As provided in step 302 above, the zero-weight conductance values for the RPU devices in cross-point array 402 (matrix A) were copied to a reference array. See, for example, cross-point array 406 (reference matrix) of FIG. 4. During training, these zero-weight conductance values are used in step 304 to adjust the output values of the RPU devices in cross-point array 402 (matrix A) to their symmetry point to account for bias in their switching behavior (see above). To do so, the same voltage pulses applied in step 304 to cross-point array 402 (matrix A) are also applied to the reference array. The output vector y of cross-point array 402 (matrix A) is then subtracted from that of the reference array. This zero-shifting technique is described in detail in U.S. patent application Ser. No. 16/158,056, the contents of which are incorporated by reference as if fully set forth herein.

Referring back to methodology 300 of FIG. 3, in step 308 a backward cycle is performed on matrices A and C. Generally, the backward cycle involves calculating the error signal δ and backpropagating that error signal δ through matrices A and C via a vector-matrix multiplication on the transpose (interchanging each row and corresponding column) of matrices A and C (z=$W^T$δ), where the vector δ represents the error calculated by the output neurons and the vector z is further processed using the derivative of neuron non-linearity and then passed down to the previous layers.

As with the forward pass, the backward cycle is also performed on the matrices A and C separately in step 308, and then the linear combination is calculated in step 310. For instance, referring briefly to FIG. 6, it is shown that the vector-matrix multiplication operations of the backward cycle are implemented (as per step 308) in the cross-point arrays 402 (matrix A) and 508 (matrix C).

Figure 6:
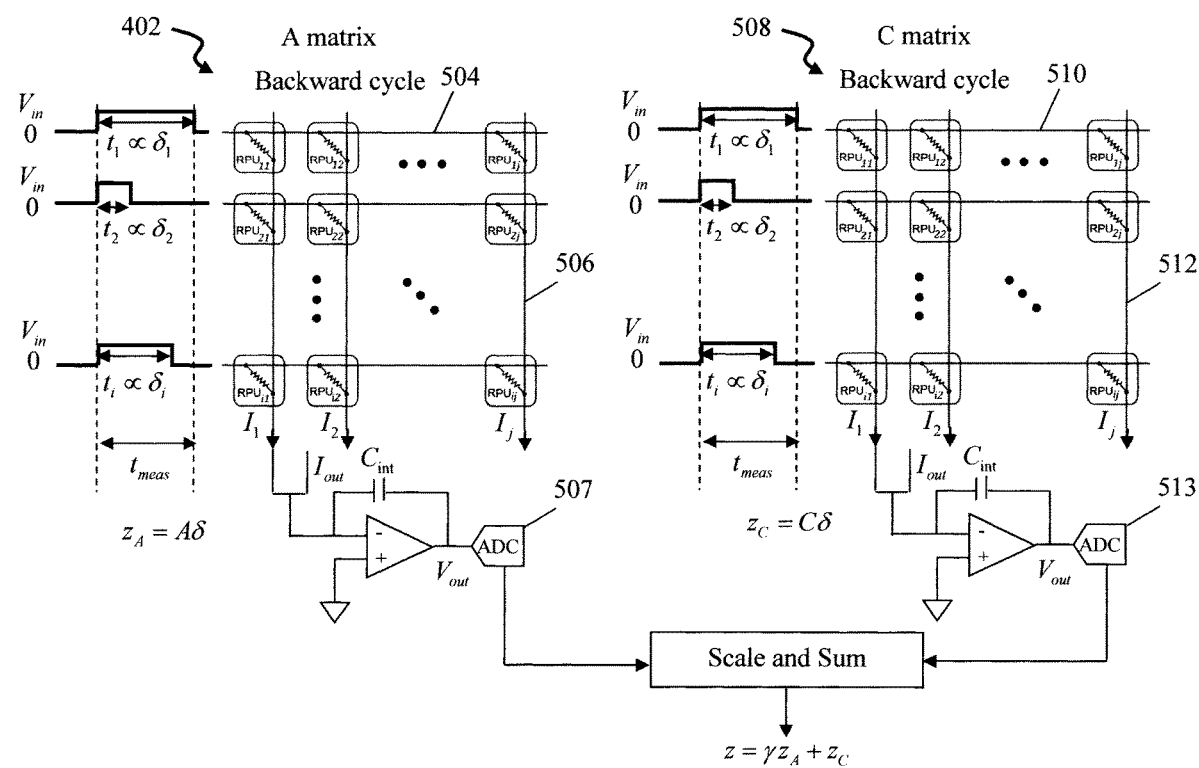
FIG. 6 is a diagram illustrating a backward cycle $z=W^T\delta$ being performed separately on the matrix A and the matrix C, with z as a linear combination of output from the matrix A and the matrix C according to an embodiment of the present invention.

As shown in FIG. 6, in the backward cycle, the error signal δ is transmitted as voltage pulses through each of the conductive row wires 504 and 510, and the resulting output vector z is read as the current output from the conductive column wires 506 and 512 of cross-point arrays 402 (matrix A) and 508 (matrix C), respectively, as per step 308 of methodology 300. When voltage pulses are supplied from the row wires 504 and 510 as input to the backward cycle, then a vector-matrix product is computed on the transpose of the matrices A and C.

As also shown in FIG. 6, ADC 507 and ADC 513 are employed to convert the (analog) output vectors $z_A = A\delta$ and $z_C = C\delta$, from cross-point arrays 402 (matrix A) and 508 (matrix C), respectively, to digital signals. Thus, as per step 310 of methodology 300, the linear combination of these digitized signals, $z = (\gamma z_A + z_C)$, can be easily determined, i.e., $$z_A = A\delta$$

$$z_C = C\delta$$

$$Z = \gamma z_A + z_C$$

As shown in FIG. 6, the signals generated by the different arrays but corresponding to the same rows for the backward cycle are scaled and summed in the digital domain.

As provided above, the zero-weight conductance values for the RPU devices in cross-point array 402 (matrix A) were copied to a reference array. See, for example, cross-point array 406 (reference matrix) of FIG. 4. During training, these zero-weight conductance values are used in step 308 to adjust the output values of the RPU devices in cross-point array 402 (matrix A) to their symmetry point to account for bias in their switching behavior (see above). To do so, the same voltage pulses applied in step 308 to cross-point array 402 (matrix A) are also applied to the reference array. The output vector z of cross-point array 402 (matrix A) is then subtracted from that of the reference array.

Figure 7:
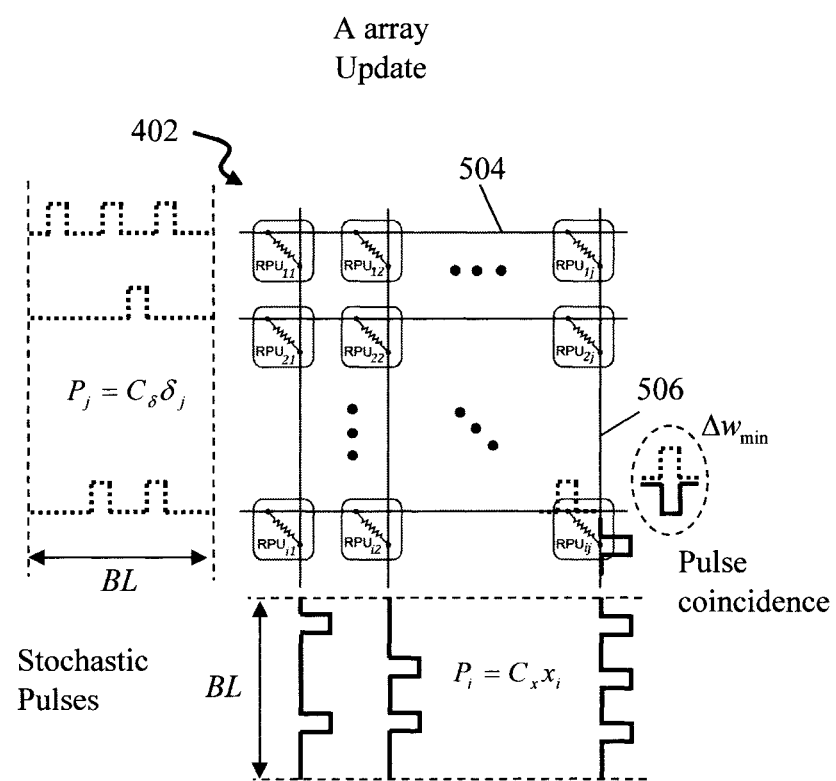
FIG. 7 is a diagram illustrating the array A being updated with x propagated in the forward cycle and $\delta$ propagated in the backward cycle $A \leftarrow A+\eta(x \otimes \delta)$ according to an embodiment of the present invention.

Referring back to methodology 300 of FIG. 3, in step 312 matrix A is updated using the input vector x propagated in the forward cycle and the error signal S propagated in the backward cycle, i.e., $A \leftarrow A + \eta(x \otimes d)$. As provided above, $\eta$ is a global learning rate. Referring briefly to FIG. 7, it is shown that these updates to matrix A are implemented in cross-point array 402 (matrix A) by transmitting voltage pulses representing vector x (from the forward cycle) and vector δ (from the backward cycle) simultaneously supplied from the conductive column wires 506 and conductive row wires 504, respectively. In contrast to the voltage pulses employed for the forward and backward cycles, the update cycle uses stochastic pulses P—see FIG. 7. In this configuration, each RPU in cross-point array 402 performs a local multiplication and summation operation by processing the voltage pulses coming from the corresponding conductive column wires 506 and conductive row wires 504, thus achieving an incremental weight update.

Optionally, steps 304-312 can be repeated multiple times prior to performing a forward cycle on matrix A (step 314) and updating matrix C (step 316)—as described below. See FIG. 3. According to an exemplary embodiment, steps 304-312 are repeated n times, wherein n is from 2 to 100 and ranges therebetween.

Next, in step 314 of methodology 300 a forward cycle is performed on matrix A using an input vector $e_i$, i.e., $y' = Ae_i$. At each time step a new input vector $e_i$ is used and the sub index i denotes that time index.

As will be described in detail below, according to an exemplary embodiment, input vector $e_i$ is a one hot encoded vector. For instance, as is known in the art, a one hot encoded vector is a group of bits having only those combinations having a single high (1) bit and all other bits a low (0). To use a simple, non-limiting example for illustrative purposes, assume a matrix of the size 4×4, the one hot encoded vectors will be one of the following vectors: [1 0 0 0], [0 1 0 0], [0 0 1 0] and [0 0 0 1]. At each time step a new one hot encoded vector is used and the sub index i denotes that time index. It is notable, however, that other methods are also contemplated herein for choosing input vector $e_i$. For instance, input vector $e_i$ can instead be chosen from the columns of a Hadamard matrix, a random matrix, etc. See below.

Figure 8:
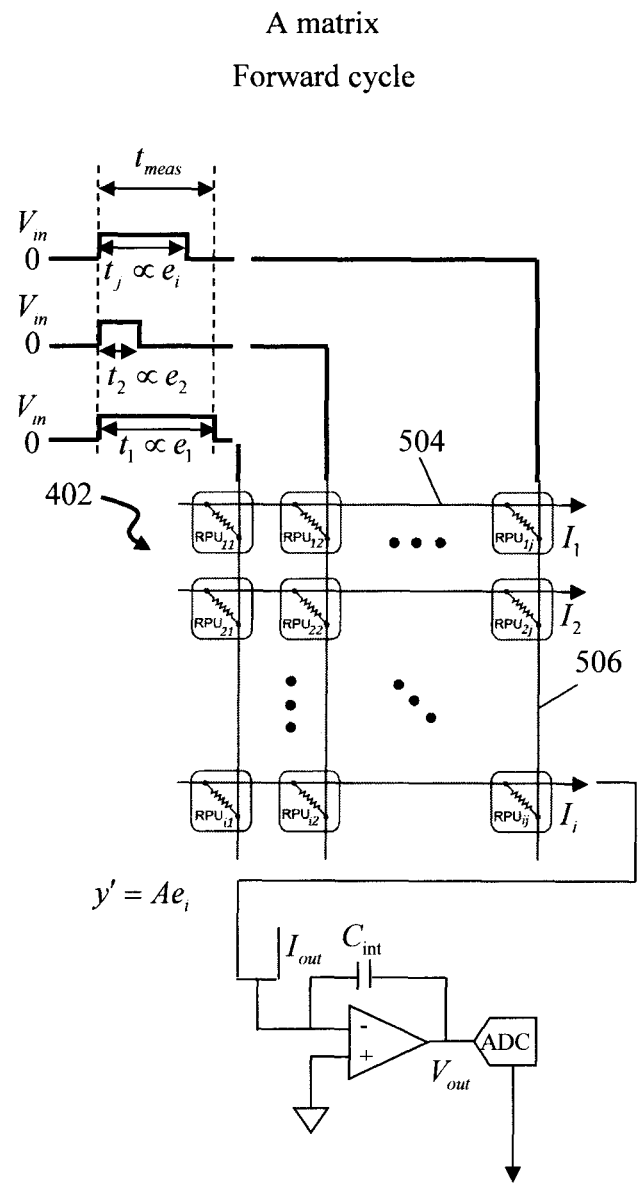
FIG. 8 is a diagram illustrating a forward cycle $y'=Ae_i$ being performed on the matrix A according to an embodiment of the present invention.

Referring briefly to FIG. 8, it is shown that in this forward cycle performed on matrix A, the input vector $e_i$ is transmitted as voltage pulses through each of the conductive column wires 506, and the resulting output vector y' is read as the current output from the conductive row wires 504 of cross-point array 402 (matrix A). When voltage pulses are supplied from the column wires 506 as input to this forward cycle performed on matrix A, then a vector-matrix product is computed.

As provided above, the zero-weight conductance values for the RPU devices in cross-point array 402 (matrix A) were copied to a reference array. See, for example, cross-point array 406 (reference matrix) of FIG. 4. These zero-weight conductance values are used in step 314 to adjust the output values of the RPU devices in cross-point array 402 (matrix A) to their symmetry point to account for bias in their switching behavior (see above). To do so, the same voltage pulses applied in step 314 to cross-point array 402 (matrix A) are also applied to the reference array. The output vector z of cross-point array 402 (matrix A) is then subtracted from that of the reference array.

Referring back to methodology 300 of FIG. 3, in step 315 a function $f(y')$ is computed using y' from step 314 using, e.g., standard digital circuitry. The function $f(y')$ can be defined in a number of different ways. For instance, by way of example only, according to one non-limiting example, $f(y') = y'$ only if $|y'| > a$ threshold T, otherwise $f(y') = 0$ for $|y'| <$ threshold T. This threshold value can be on the order of the read noise coming from the hardware. For instance, due to the analog nature of the computations y' can only be computed in a noisy fashion, i.e., $y' = Ae_i$ can only be realized as $y' = Ae_i +$ noise. This noise term for the forward read operation is known for the hardware at hand. In order to eliminate a noisy update on C matrix (see step 316—described below), one can chose T~noise so that when the signal from the forward cycle is above noise level it is applied to matrix C. This threshold function is one example to eliminate the noise but there are other functions that can be used for the same purpose. Alternatively, one could simply update matrix C in step 316 (see below) using the input vectors $e_i$ and y' from step 314.

Figure 9:
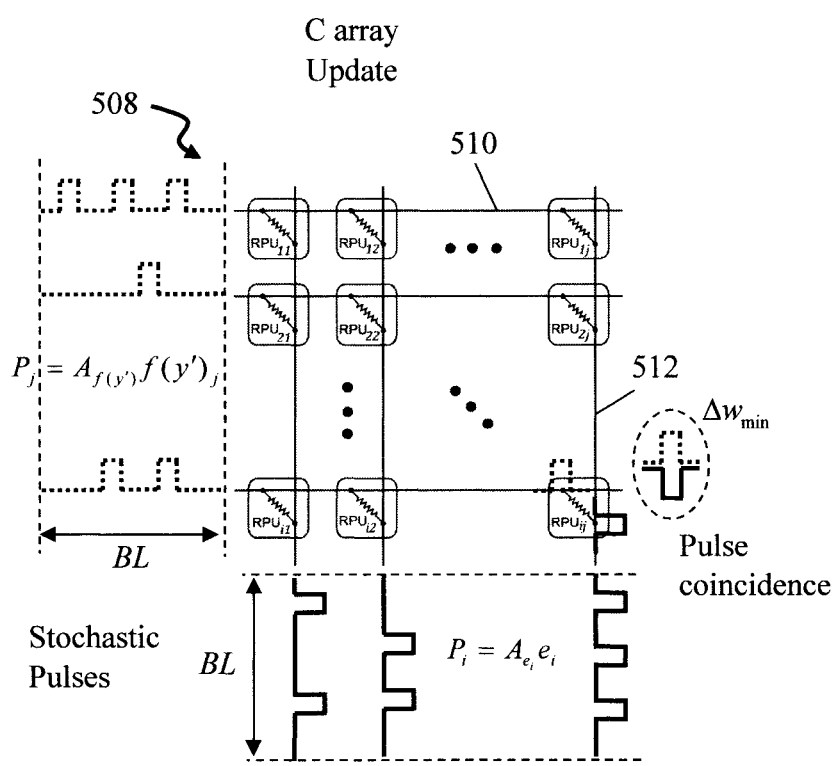
FIG. 9 is a diagram illustrating the matrix C being updated with $e_i$ and $f(y')$ according to an embodiment of the present invention.

Referring back to methodology 300 of FIG. 3, in step 316 matrix C is updated using the input vectors $e_i$ from step 314 and $f(y')$ from step 315, i.e., $C \leftarrow C + \lambda(e_i \otimes f(y'))$, wherein $\lambda$ is a scalar value that controls the strength of the updates on to the C matrix. It is a global learning rate used while updating C matrix. Referring briefly to FIG. 9, it is shown that these updates to matrix C are implemented in cross-point array 508 (matrix C) by transmitting voltage pulses representing vector $e_i$ and vector y' (if $|y'| >$ threshold T otherwise 0) from step 314 simultaneously supplied from the conductive column wires 512 and conductive row wires 510, respectively. In contrast to the voltage pulses employed for the forward and backward cycles, the update cycle uses stochastic pulses P—see FIG. 9. In this configuration, each RPU in cross-point array 508 performs a local multiplication and summation operation by processing the voltage pulses coming from the corresponding conductive column wires 512 and conductive row wires 510, thus achieving an incremental weight update.

As shown in FIG. 3, steps 304-316 are then repeated until the DNN training is complete. For instance, according to an exemplary embodiment, steps 304-316 are repeated multiple times until a certain convergence criterion is met. For instance, by way of example only, the training can be considered complete when no more improvement to the error signal is seen.

As highlighted above, according to an exemplary embodiment, the input vector $e_i$ is a one hot encoded vector which is a group of bits having only those combinations with a single high (1) bit and all other bits a low (0). See, for example, FIG. 10. As shown in FIG. 10, given a matrix of the size 4×4, the one hot encoded vectors will be one of the following vectors: [1 0 0 0], [0 1 0 0], [0 0 1 0] and [0 0 0 1]. At each time step a new one hot encoded vector is used, denoted by the sub index i at that time index.

According to another exemplary embodiment, the input vector $e_i$ is chosen from the columns of a Hadamard matrix. As is known in the art, a Hadamard matrix is a square matrix with entries ±1. See, for example, FIG. 11 (a Hadamard matrix of order 2) and FIG. 12 (a Hadamard matrix of order 4).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figures 12, 13:
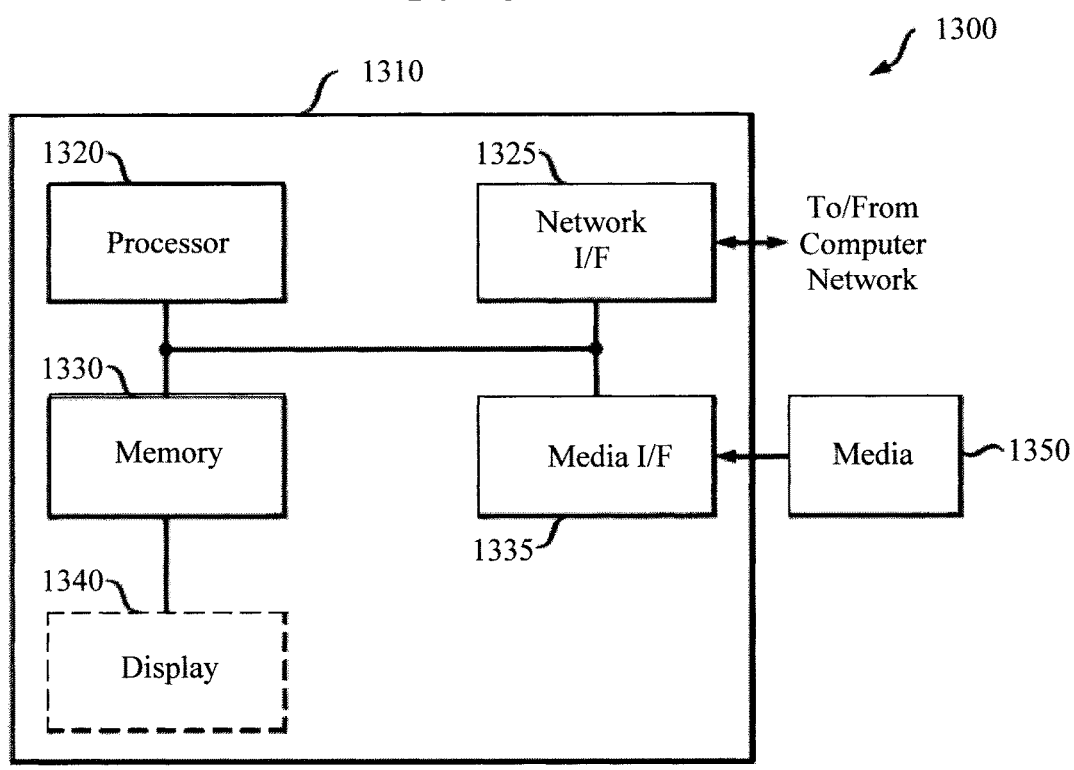
FIG. 12 is a diagram illustrating an exemplary Hadamard matrix of order 4 according to an embodiment of the present invention.
FIG. 13 is a diagram illustrating an exemplary apparatus that can be employed in carrying out one or more of the present techniques according to an embodiment of the present invention.

Turning now to FIG. 13, a block diagram is shown of an apparatus 1300 for implementing one or more of the methodologies presented herein. By way of example only, apparatus 1300 can be configured to control the input voltage pulses applied to the arrays and/or process the output signals from the arrays.

Apparatus 1300 includes a computer system 1310 and removable media 1350. Computer system 1310 includes a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional display 1340 is any type of display suitable for interacting with a human user of apparatus 1300. Generally, display 1340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of training a deep neural network (DNN), the method comprising:
    providing a weight matrix (W) as a linear combination of a matrix A and a matrix C, wherein the matrix A and the matrix C are formed by stored conductance values in separate cross-point arrays A and C of resistive processing unit (RPU) devices, each having conductive row wires orthogonal to conductive column wires, and the RPU devices separating intersections between the conductive row wires and the conductive column wires, whereby the RPU devices function as weighted connections between neurons in the DNN;
    transmitting, in a forward cycle, an input vector x as voltage pulses through the conductive column wires of the cross-point array A and the cross-point array C and reading a resulting output vector y as current output from the conductive row wires of the cross-point array A and the cross-point array C;
    transmitting, in a backward cycle, an error signal $\delta$ calculated from the output vector y as voltage pulses through the conductive row wires of the cross-point array A and the cross-point array C and reading a resulting output vector z as current output from the conductive column wires of the cross-point array A and the cross-point array C;
    transmitting, in an update of the cross-point array A, the input vector x as voltage pulses through the conductive column wires of the cross-point array A simultaneously with the error signal $\delta$ as voltage pulses through the conductive row wires of the cross-point array A;
    transmitting, in a forward cycle, an input vector $e_i$ as voltage pulses through the conductive column wires of the cross-point array A and reading a resulting output vector y' as current output from the conductive row wires of the cross-point array A;
    calculating $f(y')$ using y'; and
    transmitting, in an update of the cross-point array C, the input vector $e_i$ as voltage pulses through the conductive column wires of the cross-point array C simultaneously with $f(y')$ as voltage pulses through the conductive row wires of the cross-point array C, wherein $f(y')=y'$ only if $|y'|>$ a threshold T, otherwise $f(y')=0$.

2. The method of claim 1, further comprising:
    repeating the method until a convergence criterion is met.

3. The method of claim 1, further comprising:
    converting the output vector y from the cross-point array A and the cross-point array C to digital signals.

4. The method of claim 3, further comprising:
    calculating a linear combination of the output vector y from the cross-point array A and the cross-point array C.

5. The method of claim 1, further comprising:
    converting the output vector z from the cross-point array A and the cross-point array C to digital signals.

6. The method of claim 5, further comprising:
    calculating a linear combination of the output vector z from the cross-point array A and the cross-point array C.

7. The method of claim 1, further comprising:
    applying repeated voltage pulses to the RPU devices in the cross-point array A until all of the RPU devices in the cross-point array A converge to their own symmetry point; and
    copying zero-weight conductance values for the RPU devices in the cross-point array A to a reference array.

8. The method of claim 7, further comprising:
zero-shifting outputs of the cross-point array A by the zero-weight conductance values from the reference array.

9. The method of claim 7, wherein the repeated voltage pulses applied to the RPU devices in cross-point array A comprise up and down voltage pulses.

10. The method of claim 9, wherein the up and down voltage pulses are applied randomly to the RPU devices in cross-point array A.

11. The method of claim 9, wherein the up and down voltage pulses are applied to the RPU devices in cross-point array A in an alternating manner.

12. The method of claim 1, wherein the input vector $e_i$ comprises a one hot encoded vector.

13. The method of claim 1, wherein the input vector $e_i$ is chosen from a Hadamard matrix.

14. A method of training a DNN, the method comprising:
providing a weight matrix (W) as a linear combination of a matrix A and a matrix C, wherein the matrix A and the matrix C are formed by stored conductance values in separate cross-point arrays A and C of RPU devices, each having conductive row wires orthogonal to conductive column wires, and the RPU devices separating intersections between the conductive row wires and the conductive column wires, whereby the RPU devices function as weighted connections between neurons in the DNN;
applying repeated voltage pulses to the RPU devices in the cross-point array A until all of the RPU devices in the cross-point array A converge to their own symmetry point;
copying zero-weight conductance values for the RPU devices in the cross-point array A to a reference array;
transmitting, in a forward cycle, an input vector x as voltage pulses through the conductive column wires of the cross-point array A and the cross-point array C and reading a resulting output vector y as current output from the conductive row wires of the cross-point array A and the cross-point array C;
transmitting, in a backward cycle, an error signal δ calculated from the output vector y as voltage pulses through the conductive row wires of the cross-point array A and the cross-point array C and reading a resulting output vector z as current output from the conductive column wires of the cross-point array A and the cross-point array C;
transmitting, in an update of the cross-point array A, the input vector x as voltage pulses through the conductive column wires of the cross-point array A simultaneously with the error signal δ as voltage pulses through the conductive row wires of the cross-point array A;
transmitting, in a forward cycle, an input vector $e_i$ as voltage pulses through the conductive column wires of the cross-point array A and reading a resulting output vector y' as current output from the conductive row wires of the cross-point array A;
calculating $f(y')$ using y'; and
transmitting, in an update of the cross-point array C, the input vector $e_i$ as voltage pulses through the conductive column wires of the cross-point array C simultaneously with $f(y')$ as voltage pulses through the conductive row wires of the cross-point array C, wherein $f(y')=y'$ only if $|y'|>a$ threshold T, otherwise $f(y')=0$.

15. The method of claim 14, further comprising:
repeating the method until a convergence criterion is met.

16. The method of claim 14, further comprising:
converting the output vector y from the cross-point array A and the cross-point array C to digital signals.

17. The method of claim 16, further comprising:
calculating a linear combination of the output vector y from the cross-point array A and the cross-point array C.

18. The method of claim 14, further comprising:
converting the output vector z from the cross-point array A and the cross-point array C to digital signals.

19. The method of claim 18, further comprising:
calculating a linear combination of the output vector z from the cross-point array A and the cross-point array C.

20. The method of claim 14, further comprising:
zero-shifting outputs of the cross-point array A by the zero-weight conductance values from the reference array.

21. A method of training a DNN, the method comprising:
providing a weight matrix (W) as a linear combination of a matrix A and a matrix C, wherein the matrix A and the matrix C are formed by stored conductance values in separate cross-point arrays A and C of RPU devices, each having conductive row wires orthogonal to conductive column wires, and the RPU devices separating intersections between the conductive row wires and the conductive column wires, whereby the RPU devices function as weighted connections between neurons in the DNN;
applying repeated voltage pulses to the RPU devices in the cross-point array A until all of the RPU devices in the cross-point array A converge to their own symmetry point;
copying zero-weight conductance values for the RPU devices in the cross-point array A to a reference array;
transmitting, in a forward cycle, an input vector x as voltage pulses through the conductive column wires of the cross-point array A and the cross-point array C and reading a resulting output vector y as current output from the conductive row wires of the cross-point array A and the cross-point array C;
calculating a linear combination of the output vector y from the cross-point array A and the cross-point array C;
transmitting, in a backward cycle, an error signal δ calculated from the output vector y as voltage pulses through the conductive row wires of the cross-point array A and the cross-point array C and reading a resulting output vector z as current output from the conductive column wires of the cross-point array A and the cross-point array C;
calculating a linear combination of the output vector z from the cross-point array A and the cross-point array C;
transmitting, in an update of the cross-point array A, the input vector x as voltage pulses through the conductive column wires of the cross-point array A simultaneously with the error signal δ as voltage pulses through the conductive row wires of the cross-point array A;
transmitting, in a forward cycle, an input vector $e_i$ as voltage pulses through the conductive column wires of the cross-point array A and reading a resulting output vector y' as current output from the conductive row wires of the cross-point array A;
calculating $f(y')$ using y';
transmitting, in an update of the cross-point array C, the input vector $e_i$ as voltage pulses through the conductive column wires of the cross-point array C simultaneously with $f(y')$ as voltage pulses through the conductive row wires of the cross-point array C, wherein $f(y')=y'$ only if $|y'|>$ a threshold T, otherwise $f(y')=0$; and repeating the method until a convergence criterion is met.

22. The method of claim 21, further comprising:

converting the output vector y from the cross-point array A and the cross-point array C to digital signals; and converting the output vector z from the cross-point array A and the cross-point array C to digital signals.

23. The method of claim 21, further comprising:

zero-shifting outputs of the cross-point array A by the zero-weight conductance values from the reference array.

24. A DNN, comprising:

a weight matrix (W) comprising a linear combination of a matrix A and a matrix C, wherein the matrix A and the matrix C store conductance values in separate cross-point arrays A and C of RPU devices, each having conductive row wires orthogonal to conductive column wires, and the RPU devices separating intersections between the conductive row wires and the conductive column wires, whereby the RPU devices comprise weighted connections between neurons in the DNN; and a reference array, interconnected with the cross-point array A, that stores zero-weight conductance values for the RPU devices in the cross-point array A.

* * * * *